Patented Aug. 2, 1932

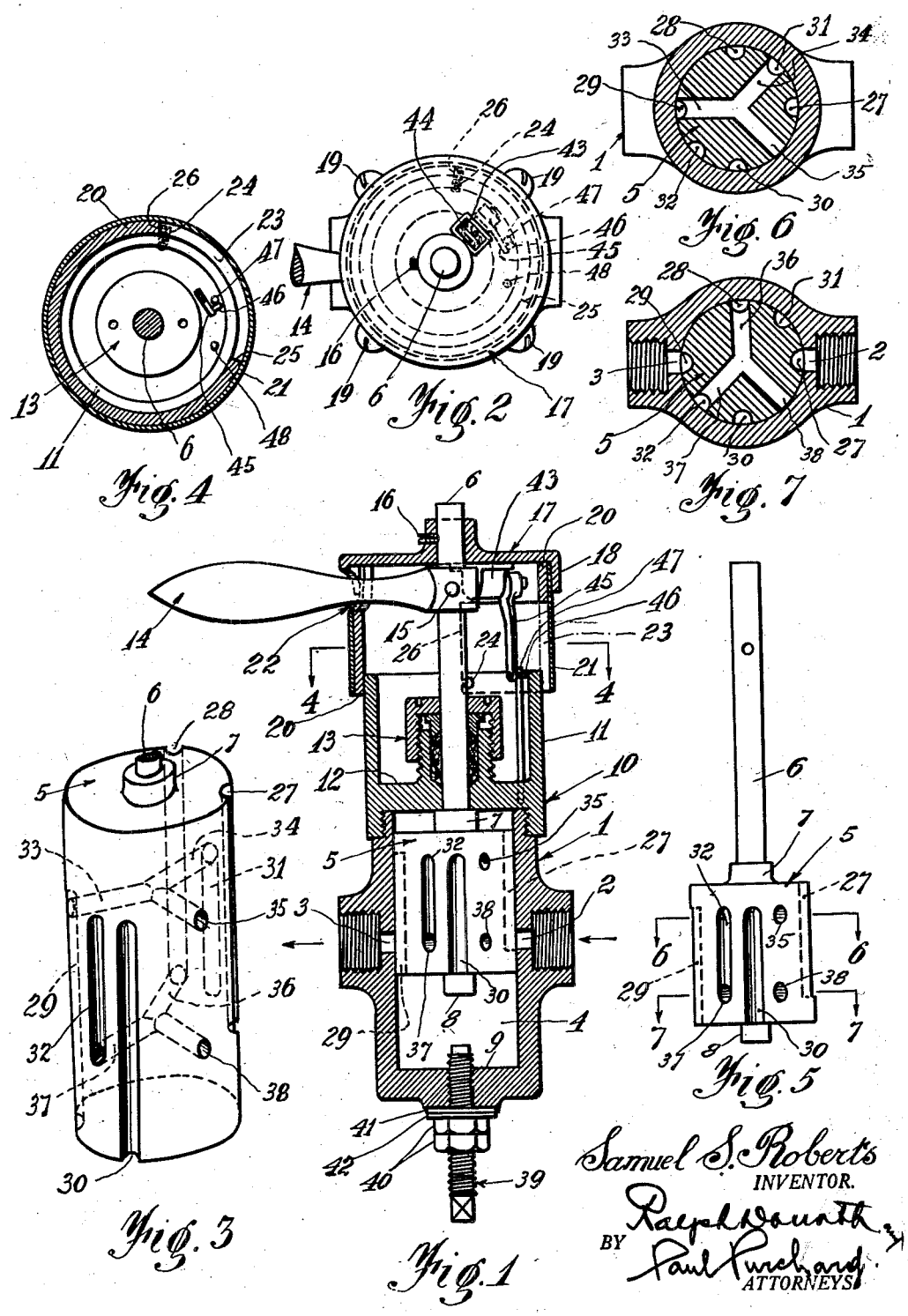

1,870,068

UNITED STATES PATENT OFFICE

SAMUEL S. ROBERTS, OF PITTSBURGH, PENNSYLVANIA

LUBRICATING VALVE

Application filed January 10, 1929. Serial No. 331,574.

This invention relates to lubricating valves adapted for use with either liquid or grease lubricants.

One of the main objects of this invention is to provide a lubricating valve operating on the so-called displacement principle, i. e., in which the amount of lubrication delivered to the valve is determined by the displacement caused by a piston reciprocating within a cylinder. Another object is to provide a lubricating valve having a reciprocable piston operating without the use of springs and in which the piston is reciprocated up and down by the fluid pressure of the lubricant. A further object is to provide a lubricating valve which is very economical because the amount of lubricant delivered by the reciprocating piston may be positively regulated to suit the requirements of the installation wherein used. Yet another object of this invention resides in providing a lubricating valve having cooperating measuring or computing means indicating the amount of lubricant delivered during each lubricating operation. Still another object of this invention is the provision of such a valve which by its operation will indicate whether or not the lubricant in the pipe line supplying the valve is flowing and which, when not operated, is always closed, thus preventing any waste of lubricant and obviating the need of an additional shut-off valve in the supply line. Another feature of this invention resides in providing a lubricating valve which is always lubricated and well balanced and which, therefore, may be operated with great ease regardless of the magnitude of the fluid pressure of the lubricant used. Additional features and advantages of this invention will be dealt with in the following description considered in connection with the accompanying drawing forming a part of this application.

In the drawing:

Fig. 1 represents a vertical section through the lubricating valve.

Fig. 2 is a top view of the valve.

Fig. 3 is a phantom view of the piston of the lubricating valve on an enlarged scale.

Fig. 4 is a section through the valve taken on line 4—4 in Fig. 1.

Fig. 5 is a side elevation of the valve piston.

Figs. 6 and 7 are sectional views taken respectively on line 6—6 and 7—7 in Fig. 5.

The present patent application relates to an improved and simplified construction of a lubricating valve operating on the displacement principle, as compared with a valve of this type forming the subject matter of an application for Letters Patent filed by me on July 3, 1928, and bearing the Serial Number 290,097 which was issued June 24, 1930, as Patent No. 1,767,552.

Reference being had to the drawing, a valve built in accordance with the present embodiment of my invention comprises a cylinder or valve-body 1 having an inlet port connection 2 and an outlet port connection 3 communicating with the cylindrical bore 4, which forms the container for the lubricant.

Slidably and rotatably mounted within the cylindrical bore is a piston 5 having a piston-rod 6 provided at its base with a stop collar 7. On the underside of the piston is centrally disposed a spacer 8, the purpose of which is to maintain an open space between the bottom 9 of the valve-body and the piston, when in its lowermost position.

On top of the valve-body is screwed on the bonnet 10 comprising the cylindrical shell 11, open at the top, and the bottom 12 in which there is centrally disposed a stuffing box 13, of any suitable and usual design, for the piston-rod 6.

The piston may be rotated by means of the operating handle 14 secured adjacent the upper end of the piston-rod by a pin 15.

Above the operating handle is secured on the piston-rod by a set-screw 16 the cover 17 having a downward cylindrical flange 18 in which are held by screws 19 the guide-sleeve 20 and the protective sleeve 21 fitting snugly on the former. The flange 18 and the sleeves 20, 21 are suitably slotted, as at 22, to accommodate the operating handle 14.

The amount of rotation of the piston is limited, in the present embodiment, to a quarter turn; this is obtained by cutting away a suitable portion 23 of the guide-sleeve 20 and placing in the shell 11 of the bonnet a stop-pin or screw 24 projecting within the cut away portion of the guide-sleeve. When rotating the piston, this stop-pin will engage the ends 25, 26 of the guide-sleeve, and thereby properly limit the amount of rotation. The purpose of providing the protective sleeve 21 is to protect the operator of the valve against getting his fingers caught in the open space 23, on the downward stroke of the piston. This shell also prevents dirt from collecting in the bonnet 10.

The piston 5 is provided with a system of grooves and ducts, the object of which is to alternately direct the lubricant to the upper side and the under side of the piston, to properly balance the fluid pressure around the piston and to lubricate the latter.

Referring especially to the phantom view, Fig. 3, the piston is provided with the longitudinal feed-grooves 27, 28 reaching to the top of the piston and the feed-grooves 29, 30 leading to the underside of the piston. The shorter grooves 31 and 32 are pressure equalizing as well as lubricating grooves. Located as shown in this figure, are two sets of ducts, each comprising three branches, the purpose of which is to supply the equalizing grooves with lubricant and to lubricate the piston and cylinder of the valve. The upper set of ducts comprises the duct 33 communicating with the feed-groove 29, the duct 34 connected to the equalizer groove 31 and the lubricating duct 35. Similarly, the lower set of ducts includes the duct 36 in communication with the feed-groove 28, the duct 37 leading to the equalizing groove 32 and the lubricating duct 38. If desired, more equalizing grooves and lubricating ducts could be placed around the piston, especially on larger sizes; but in practice I have found that with the above arrangement lubricating valves of usual size may be rotated very easily, even when using lubricants operating under fluid pressures ranging between 1500 and 2000 lbs. per square inch.

The operation of the valve is as follows: Assuming, for instance, that the piston be in the position shown in Figs. 1, 2 and 4 and that the supply line leading to the inlet port 2 be open, the lubricant will flow up the feed-groove 27 and fill the space above the piston. The lubricant will also enter the feed-groove 28 and thence flow into the ducts 36, 37 and 38 and the equalizing groove 32. The hydrostatic pressure of the lubricant forces the piston down, whereby all the lubricant priorly stored in the space below the piston will be pressed out into the outlet port 3, by first entering the feed-groove 29, which now communicates with said outlet port.

When the piston has ended its downward stroke, it is rotated by means of the operating handle 14 a quarter of a turn in a counter-clockwise direction, i. e. until the end 25 of the guide-sleeve opening 23 strikes against the stop-screw 24. This brings the feed-groove 30 in communication with the inlet port 2 and the feed-groove 28 in line with the outlet port 3. The lubricant is, therefore, fed into the space below the piston, the latter moves up and the lubricant above it is discharged through the feed-groove 28 and the outlet port 3 into the part to be lubricated. The balancing and lubrication of the piston is in this case taken care of by the feed-groove 29, the ducts 33, 34, 35 and by the equalizing groove 31, as will be readily understood. The back and forward rotation of the piston is repeated until the necessary amount of lubricant has been supplied to the part to be lubricated.

The quantity of lubricant supplied at each up and downward stroke of the piston may be regulated by means of the adjusting screw 39 located centrally of the valve bottom 9, in line with the spacer 8. This screw is locked into position by the lock-nuts 40, and any leakage of lubricant is prevented by a sealing gasket 41 supported by a washer 42.

When the amount of lubricant to be served to a bearing, or other part to be lubricated, is large, the number of times the piston has to be rotated back and forth may be so great, on account of the reduced size of the lubricating valve, as to lead to error in counting by the operator. In such cases it is advisable to supply the lubricating valve with a suitable counting or metering device.

In the arrangement shown in the drawing, a counter 43, of a well known commercial type, is fastened to the underside of the cover 17 and an opening 44 is cut in the same to show the reading of the counter. The latter has a depending operating lever 45 provided with a pin 46 which engages alternately one of the vertical stop-pins 47 and 48 suitably spaced and secured at their lower ends in the bottom of the bonnet 10. As will be readily seen, the back and forth rotation of the piston swings the lever 45 right and left and causes the rotations to be recorded numerically on the counter 43. The amount of lubricant delivered for each up and down stroke of the piston, for any given adjustment of the screw 39, may be easily ascertained and, therefore, the numerical record of the counter will indicate positively the amount of lubricant delivered to the part to be lubricated.

It will be observed from the drawing and the above description of the operation of the valve, that the latter is always closed when at the end of its strokes; therefore, the use and expense of special shut-off valves in either the supply of discharge pipes of a lubricating installation may be dispensed with.

Moreover, it will also be noted that a valve of my invention will at all times indicate whether or not the supply or discharge pipes are obstructed, since in case of obstruction, the piston will fail to reciprocate up and down, thus warning the operator of some trouble in the pipe lines and preventing any damage to the part to be lubricated due to lack of lubrication. This is, of course, not the case where ordinary globe or gate valves are used, because it is impossible to judge whether or not the lubricant is flowing in the pipe-lines by their behavior.

This feature is of especial importance where roller or ball bearings are involved, the operation of which may be impaired by the excessive friction due to the containers and races of the bearings being packed full of grease under high pressure; in such a case the piston of my lubrication valve would fail to reciprocate up and down.

While I have illustrated and described herein the present embodiment of my invention, and one which I have found by actual use to be very practical for high and low pressure work, it may be found desirable after continued experience to make slight changes in the construction and arrangement of the details of my invention, and I intend to include in this application all such changes as fall within the scope of the appended claims.

I claim:

1. In a lubricating device, a cylinder; a container for the lubricant; inlet and outlet connections on the cylinder for the lubricant; a piston oscillatable and longitudinally reciprocable in the cylinder; means to oscillate the piston; said piston having a system of superficial grooves comprising a pair of longitudinal feed-grooves reaching to opposite ends of the piston, a pair of discharge-grooves also reaching to opposite ends of the piston, and in diametrically opposite relation to the feed-grooves, and an equalizer-groove, closed at both ends, positioned intermediate each pair of grooves terminating at the same end of said piston, said piston having also two sets of transversely disposed ducts each set comprising three connected branches, two of said branches connecting one discharge groove with an equalizer-groove and the third branch being adapted to convey the lubricant to a part of the periphery of the piston.

2. In a lubricating device, a cylinder; a container for the lubricant; inlet and outlet connections on the cylinder for the lubricant; a piston manually oscillatable and longitudinally reciprocable in the cylinder by the fluid pressure of the lubricant; means to oscillate the piston; said piston having a system of superficial grooves comprising a pair of longitudinal feed-grooves disposed substantially in 90° angular relation and reaching to opposite ends of the piston; a pair of discharge-grooves also reaching to opposite ends of the piston and in diametrically opposite relation to the feed-grooves, and an equalizer-groove, closed at both ends, positioned intermediate each pair of grooves terminating at the same end of said piston; said piston having also two sets of transversely disposed ducts each set adapted to connect one discharge-groove with one equalizer-groove.

3. In a lubricating device, a cylinder; a container for the lubricant; inlet and outlet connections on the cylinder for the lubricant; a piston manually oscillatable and longitudinally reciprocable in the cylinder by the fluid pressure of the lubricant; means to oscillate the piston; said piston having a system of superficial grooves comprising a pair of longitudinal feed-grooves disposed substantially in 90° angular relation and reaching to opposite ends of the piston, a pair of discharge-grooves also reaching to opposite ends of the piston and in diametrically opposite relation to the feed-grooves, and an equalizer-groove, closed at both ends, positioned intermediate each pair of grooves terminating at the same end of said piston; said piston having also two sets of transversely disposed ducts each set comprising three radially disposed connected branches, two of said branches connecting one discharge-groove with the equalizer-groove on the opposite half of the periphery of the piston, and the third branch being adapted to convey lubricant to a part of the piston-periphery intermediate the two feed-grooves.

In testimony whereof I affix my signature.

SAMUEL S. ROBERTS.